Patented May 16, 1944

2,348,761

UNITED STATES PATENT OFFICE 2,348,761

METHOD OF PRODUCING PROTEIN PLASTICS BY COLD MOLDING

Oswald C. H. Sturken, Closter, N. J., assignor of fifty per cent to Harriet Sturken, Closter, N. J., and fifty per cent to Sidney L. Reich, Forest Hills, Long Island, N. Y.

No Drawing. Application October 28, 1941, Serial No. 416,906

7 Claims. (Cl. 18—48)

This invention relates to methods of producing plastics. It is particularly directed to an improved cold mold method of producing plastics from proteins.

An object of this invention is to provide a process of the character described for producing plastic articles such as buckles, or the like articles by a cold molding process.

A further object of this invention is to provide a process of the character described for making plastic articles by cold molding from proteins such as zein, soy bean meal, casein, blood albumin or ground horn.

Other objects of my invention will hereinafter appear in the following specification and the novel features thereof will be particularly pointed out in the appended claims.

Finely granulated protein matter such as casein, soy bean meal, corn protein, practically free of starch or refined by alcoholic extraction (zein), blood albumin or ground horn in accordance with the present invention may be compressed in a cold mold under high pressures preferably 15,000 pounds per square inch into the desired shape. The protein matter should contain about 10% moisture which may be sprayed in and can also be mixed with pigments to obtain desired color effects, and also with plasticizers such as urea, diethylene glycol or dibutyl tartrate. The duration of the pressure in the mold may be about one second, although instantaneous pressure is sufficient.

Articles thus produced are firm enough to withstand subsequent treatment with formaldehyde in a manner well known to manufacturers of protein plastics. However, some types of protein like zein, which is an alcohol soluble protein of corn, have a tendency to become tacky and to stick together in the formaldehyde solution. This is also true of protein compounds containing water soluble plasticizers. Thus, when a number of articles are in a formaldehyde solution of water, they tend to stick together and to the surface of the container.

I have found that the addition of kieselguhr to the formaldehyde solution covers the molded articles to prevent them from sticking together and to the container. The kieselguhr is a porous infusorial, inorganic diatomaceous earth and allows the formaldehyde to penetrate therethrough. The formaldehyde hardens the protein and fuses it. If only surface hardening is desired, the formaldehyde treatment can be applied for only a day or two, or it can be continued for longer periods until full penetration is obtained.

After taking the articles out of the formaldehyde solution, they may be dried carefully with slowly rising temperatures to prevent blistering. Temperature during drying should not exceed 200 degrees F. After the articles are dried until substantially free of moisture, they may be baked at elevated temperatures such as 250 degrees F.

In carrying out my improved process, zein in powder form, preferably between 60 and 120, mesh is mixed with water to the amount sufficient to bring the total moisture content to 10%. The moistened zein may then be sifted through a 40 mesh screen to break up lumps which may have formed by adding the water. The sifted mixture is then placed in a cold mold to produce any desired article. The mold may be placed in a hydraulic press and put under pressure of about 1500 to 15,000 lbs. per square inch.

The article is then removed from the mold and placed in a vessel containing 40% aqueous formaldehyde to which is added 25% by weight of kieselguhr. This slurry of formaldehyde and kieselguhr should be kept in motion either by a propeller in the vessel (protected by a screen) or by revolving the vessel or by shaking the vessel to prevent the kieselguhr from settling. After about 30 minutes to one hour, the articles' surfaces which have become tacky by the action of the formaldehyde, are coated with the particles of kieselguhr, which prevents the articles from adhering to each other in the batch, or to the inner surfaces of the vessel. Since the kieselguhr is porous, it does not prevent penetration of the formaldehyde.

If desired, the articles may be removed from the formaldehyde-kieselguhr slurry and treated further in 40% aqueous formaldehyde containing no kieselguhr, leaving the slurry free for treatment of the next batch.

The duration of the treatment in the formaldehyde bath depends upon the thickness of the article and the use to which it is put. A buckle for example has to be strong enough to enable it to withstand laundering. A full penetration, or nearly so, by the formaldehyde is therefore desirable to produce a tough, strong buckle. A buckle or other article of ⅛ inch thickness requires an immersion of from 4 or 5 days to become fully homogeneous.

After the article is treated in the formaldehyde-kieselguhr slurry (and thereafter in a formaldehyde bath if desired), said article is allowed to dry under atmospheric conditions for about two days. Further drying at 70 degrees C. for 24 to 36 hours is required to remove all excess moisture. If it is desired to make the article extremely water resistant, baking of the dried article at 100 degrees C. for two hours should be carried out.

The fine coating of kieselguhr which remains adhered to the article gives the same a satin finish which may be desirable in some cases. However, if a high lustre is desired, the article should thereafter be submerged in sodium hypochloride of about 60 degrees C. for about five minutes followed by a thorough washing. Such treatment removes the kieselguhr particles on the surface and produces a surface of high lustre which is not affected by washing in hot soapy water or steam.

Proteins such as casein, soy bean meal or blood albumin, ground to pass a 100 mesh screen may be ballmilled with 2% titanium dioxide (whiting) or other pigments, such as red iron oxide, which are resistant to formaldehyde and a plasticizer. The ballmilling process may be carried out for about 15 minutes to several hours. Water sufficient to bring the moisture content of the casein to 10% may be added and the whole mixture is then passed through a 40 mesh screen to take out any lumps that may have resulted by the addition of the water. This product may then be cold molded in an automatic tabletting machine of either the single stroke or rotary type fitted with punchers and dies to produce articles of desired shape. The casein may be cold molded in any suitable mold under high pressure. The molded articles are then submerged in an aqueous formaldehyde solution of from 25 to 40% by volume strength, if said articles already contain urea. If they do not contain urea, then the bath should contain other casein solvents such as diethylene or triethylene glycol miscible in water. The solution may also contain kieselguhr or other porous material not affected by aqueous formaldehyde, such as ground charred bone. The procedure for drying and baking of the article is the same as outlined above for zein.

It will thus be seen that I have provided a composition and method in which the several objects of this invention are achieved and which are adapted to meet the condition of practical use.

As various possible embodiments might be made of the above invention, and as various changes might be made in the embodiment above set forth, it is to be understood that all matter herein set forth, is to be interpreted as illustrative and not in a limiting sense.

Having thus described my invention, I claim as new and desire to secure by Letters Patent:

1. A process of the character described, consisting in inserting a molded protein article in a bath comprising formaldehyde and kieselguhr.

2. A process of the character described, consisting in inserting a molded protein article in a bath comprising formaldehyde and kieselguhr, then taking the article out of the bath and drying the same.

3. A process of the character described, consisting in inserting a cold molded protein article in a bath comprising formaldehyde and kieselguhr, then taking the article out of the bath and drying the same and then baking the article at between 70 and 100 degrees C.

4. A process of the character described, consisting in placing a molded zein article in a bath comprising formaldehyde and keiselguhr.

5. A process of the character described, consisting in placing a molded zein article in a bath comprising formeldehyde and kieselguhr, then taking the molded article out of said bath and placing it in a formaldehyde bath.

6. A process of the character described, consisting in placing a molded zein article in a bath comprising formaldehyde and kieselguhr, then taking the molded article out of said bath and placing it in a formaldehyde bath, then taking the molded article out of said second bath and drying the same under atmospheric conditions.

7. A process of the character described, consisting in placing a molded zein article in a bath comprising formaldehyde and kieselguhr, then taking the article out of said bath and drying the same under atmospheric conditions and then treating the article under temperature of between 70 and 100 degrees C.

OSWALD C. H. STURKEN.